US012619374B2

(12) United States Patent
Anchi et al.

(10) Patent No.: US 12,619,374 B2
(45) Date of Patent: May 5, 2026

(54) HOST MULTI-PATH LAYER WITH DYNAMIC ADJUSTMENT OF ZONE SETS THROUGH INTERACTION WITH A CENTRALIZED DISCOVERY CONTROLLER

(71) Applicant: Dell Products L.P., Round Rock, TX (US)

(72) Inventors: Amit Pundalik Anchi, Bangalore (IN); Rimpesh Patel, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/519,353

(22) Filed: Nov. 27, 2023

(65) Prior Publication Data

US 2025/0173087 A1    May 29, 2025

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ...... G06F 3/0655; G06F 3/0604; G06F 3/067; G06F 3/0635
See application file for complete search history.

(56) References Cited

U.S. PATENT DOCUMENTS

| | | | |
|---|---|---|---|
| 9,495,486 B1 * | 11/2016 | Aluru ....................... | G06F 30/20 |
| 10,310,760 B1 | 6/2019 | Dreier et al. | |
| 10,893,105 B1 | 1/2021 | Bono et al. | |
| 11,418,594 B1 * | 8/2022 | Rao ........................ | H04L 67/101 |
| 11,422,718 B1 * | 8/2022 | Chauhan ............... | G06F 3/0635 |
| 11,550,511 B2 | 1/2023 | Mallick et al. | |
| 11,631,003 B2 | 4/2023 | Martin et al. | |

(Continued)

FOREIGN PATENT DOCUMENTS

JP        2011118712 A    6/2011

OTHER PUBLICATIONS

Excerpt of NVM Express Base Specification Rev. 1.4; Published 2021; incorporated by reference in Smith '899 (Year: 2021).*

(Continued)

*Primary Examiner* — Rocio Del Mar Perez-Velez
*Assistant Examiner* — Julian S Mendel
(74) *Attorney, Agent, or Firm* — Ryan, Mason & Lewis, LLP

(57) ABSTRACT

An apparatus in an illustrative embodiment comprises at least one processing device that includes a processor coupled to a memory. The at least one processing device is configured to implement a centralized discovery controller for coupling to a host and to a storage system accessed by the host. The centralized discovery controller is configured to receive, from at least one of the host and the storage system, information indicating a need for an adjustment in at least one zone set, a given such zone set specifying a plurality of endpoints including one or more host endpoints and one or more storage system endpoints, and responsive to the received information, to automatically initiate the adjustment in the at least one zone set. The host endpoints illustratively comprise respective host initiators and the storage system endpoints illustratively comprise respective storage system targets.

20 Claims, 5 Drawing Sheets

(56) References Cited

U.S. PATENT DOCUMENTS

| | | | |
|---|---|---|---|
| 11,733,912 | B2 | 8/2023 | Chen et al. |
| 11,762,595 | B1 | 9/2023 | Achkinazi et al. |
| 2003/0149773 | A1 | 8/2003 | Harbin et al. |
| 2007/0079081 | A1 | 4/2007 | Gladwin et al. |
| 2009/0154472 | A1 | 6/2009 | Chung et al. |
| 2009/0254572 | A1 | 10/2009 | Redlich et al. |
| 2011/0138144 | A1 | 6/2011 | Tamura et al. |
| 2013/0055249 | A1 | 2/2013 | Vaghani et al. |
| 2013/0198312 | A1 | 8/2013 | Tamir et al. |
| 2013/0226887 | A1 | 8/2013 | Braam et al. |
| 2015/0012607 | A1 | 1/2015 | Cayton et al. |
| 2017/0177216 | A1 | 6/2017 | Freyensee et al. |
| 2017/0177222 | A1 | 6/2017 | Singh et al. |
| 2018/0205635 | A1 | 7/2018 | Kim et al. |
| 2018/0239539 | A1 | 8/2018 | He et al. |
| 2019/0102093 | A1 | 4/2019 | Parnell et al. |
| 2019/0146675 | A1 | 5/2019 | Subramanian et al. |
| 2019/0377696 | A1 | 12/2019 | Patel et al. |
| 2020/0019521 | A1 | 1/2020 | Solanki et al. |
| 2020/0026606 | A1 | 1/2020 | Farnum et al. |
| 2020/0225863 | A1 | 7/2020 | Veluswamy et al. |
| 2020/0326868 | A1 | 10/2020 | Yang et al. |
| 2020/0349094 | A1* | 11/2020 | Smith ................. H04L 67/1029 |
| 2020/0351221 | A1* | 11/2020 | Subramani .............. H04L 12/28 |
| 2021/0034270 | A1* | 2/2021 | Gupta ................. G06F 13/1668 |
| 2021/0288878 | A1* | 9/2021 | Smith ................... G06F 3/0631 |
| 2021/0311899 | A1* | 10/2021 | Smith ................. G06F 13/4295 |
| 2021/0405915 | A1 | 12/2021 | Agarwal |
| 2021/0406678 | A1 | 12/2021 | Martin et al. |
| 2022/0066957 | A1* | 3/2022 | Patel ..................... G06F 9/5011 |
| 2022/0091761 | A1* | 3/2022 | Patel ..................... G06F 3/0605 |
| 2022/0171538 | A1* | 6/2022 | Charles ................... G06F 3/061 |
| 2022/0174094 | A1* | 6/2022 | Subbiah ............... G06F 3/0622 |
| 2022/0283729 | A1* | 9/2022 | Desanti ................ G06F 3/0655 |
| 2022/0300176 | A1* | 9/2022 | Smith ................... G06F 3/0659 |
| 2022/0374167 | A1 | 11/2022 | Mallick et al. |
| 2023/0229341 | A1 | 7/2023 | Chen et al. |
| 2023/0297238 | A1 | 9/2023 | Mallick et al. |
| 2023/0325084 | A1 | 10/2023 | Achkinazi et al. |

OTHER PUBLICATIONS

Storpool Storage, "Demystifying: What is NVMeOF?" https://storpool.com/blog/demystifying-what-is-nvmeof, Sep. 12, 2017, 4 pages.
VMware, "VMware ESX Server," Product Datasheet, 2007, 4 pages.

Wikipedia, "Host Adapter," https://en.wikipedia.org/wiki/Host_adapter, Jul. 19, 2021, 4 pages.
Wikipedia, "iSCSI," https://en.wikipedia.org/wiki/ISCSI, Dec. 22, 2021, 10 pages.
Wikipedia, "NVM Express," https://en.wikipedia.org/wiki/NVM_Express, Jan. 13, 2022, 18 pages.
A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.
Wikipedia, "Remote Direct Memory Access," https://en.wikipedia.org/wiki/Remote_direct_memory_access, Jan. 30, 2021, 3 pages.
M. Hoyt, "ScaleIO Tech Overview and Concepts: SDS-SAN vs SDS-Array," https://www.thinkahead.com/TheLAB/scaleio-tech-overview-concepts-sds-san-vs-sds-array/, Apr. 5, 2017, 16 pages.
EMC Corporation, "EMC ScaleIO Architectural and Functional Overview," EMC White Paper, Dec. 2013, 13 pages.
Dell EMC, "Dell EMC VxFlex OS: Networking Best Practices and Design Considerations," Dell EMC White Paper, Jul. 2018, 38 pages.
R. Kerns, "What is Block I/O?" searchstorage.techtarget.com/answer/What-is-block-I-O, Oct. 19, 2005, 2 pages.
Janalta Interactive, "Client-Side" https://www.techopedia.com/definition/439/client-side, Accessed Jan. 14, 2022, 8 pages.
EMC Corporation, "EMC ScaleIO Design Considerations and Best Practices," EMC White Paper, Jun. 2016, 30 pages.
Mellanox Technologies, "RoCE vs. iWARP Competitive Analysis," White Paper, Feb. 2017, 6 pages.
NVM Express, "NVM Express Base Specification, Revision 2.0c," NVM Express, Oct. 4, 2022, 458 pages.
Dell Technologies, "Dell PowerFlex," Spec Sheet, Aug. 2023, 14 pages.
H. Strass, "An Introduction to NVMe," https://labs.seagate.com/portfolio/an-introduction-to-nvme/, May 2016, 8 pages.
U.S. Appl. No. 17/964,560 filed in the name of Igor Achkinazi et al. on Oct. 12, 2022, and entitled "Host-Based Locality Determination Using Locality Log Pages."
U.S. Appl. No. 18/335,240 filed in the name of Igor Achkinazi et al. on Jun. 15, 2023, and entitled "Storage System with Automated Filtering of Discovery Information Utilizing Specified Configuration Domains."
U.S. Appl. No. 18/244,454 filed in the name of Sanjib Mallick et al. on Sep. 11, 2023, and entitled "Host Multi-Path Layer with Proxy Volume Redirection for Enhanced Scalability of Distributed Storage Systems."
U.S. Appl. No. 18/499,333 filed in the name of James R. Salvadore et al. on Nov. 1, 2023, and entitled "Host Multi-Path Layer with Congestion Mitigation through Interaction with Centralized Discovery Controller."

* cited by examiner

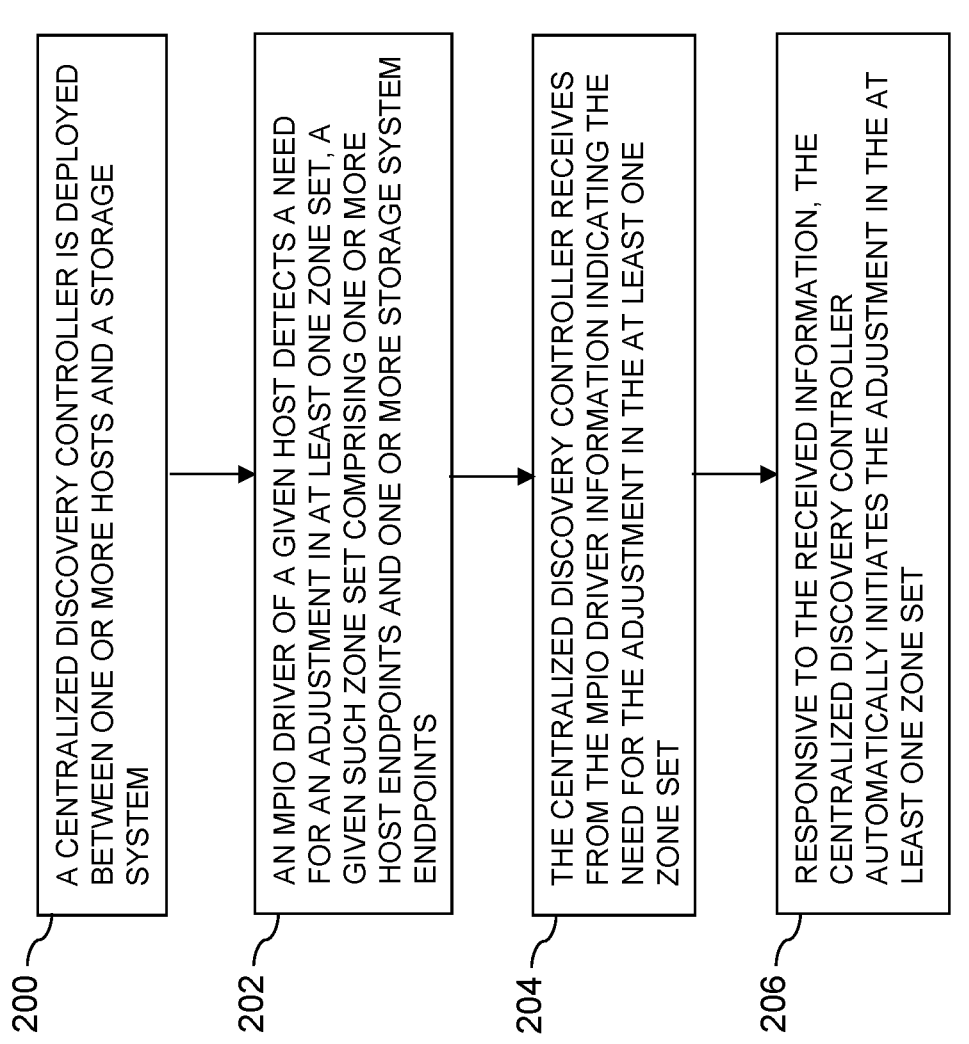

A CENTRALIZED DISCOVERY CONTROLLER IS DEPLOYED BETWEEN ONE OR MORE HOSTS AND A STORAGE SYSTEM

200

AN MPIO DRIVER OF A GIVEN HOST DETECTS A NEED FOR AN ADJUSTMENT IN AT LEAST ONE ZONE SET, A GIVEN SUCH ZONE SET COMPRISING ONE OR MORE HOST ENDPOINTS AND ONE OR MORE STORAGE SYSTEM ENDPOINTS

202

THE CENTRALIZED DISCOVERY CONTROLLER RECEIVES FROM THE MPIO DRIVER INFORMATION INDICATING THE NEED FOR THE ADJUSTMENT IN THE AT LEAST ONE ZONE SET

204

RESPONSIVE TO THE RECEIVED INFORMATION, THE CENTRALIZED DISCOVERY CONTROLLER AUTOMATICALLY INITIATES THE ADJUSTMENT IN THE AT LEAST ONE ZONE SET

HOST MULTI-PATH LAYER WITH DYNAMIC ADJUSTMENT OF ZONE SETS THROUGH INTERACTION WITH A CENTRALIZED DISCOVERY CONTROLLER

FIELD

The field relates generally to information processing systems, and more particularly to storage in information processing systems.

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host that utilizes the software-defined storage system, such a storage system provides a logical storage volume view to allow a given application to store and access data, without the application being aware that the data is being dynamically distributed among different storage nodes. In these and numerous other storage system arrangements, it can be difficult to configure and adjust zone sets, particularly when using advanced storage access protocols such as Non-Volatile Memory Express (NVMe) over Fabrics, also referred to as NVMe-oF, or NVMe over Transmission Control Protocol (TCP), also referred to as NVMe/TCP. For example, conventional approaches in these and other contexts often require excessive manual intervention by storage administrators or other users.

SUMMARY

Illustrative embodiments provide techniques for dynamic adjustment of zone sets at least in part through interaction of a multi-path layer of one or more hosts with a centralized discovery controller. The centralized discovery controller in some embodiments is implemented, for example, in a switch fabric of a network through which the one or more hosts communicate with a distributed storage system or other type of storage system.

Such techniques advantageously facilitate the usage of advanced storage access protocols such as NVMe-oF or NVMe/TCP while avoiding the above-described drawbacks of conventional practice. For example, some embodiments can substantially eliminate or otherwise alleviate the need for manual intervention, thereby providing significantly more flexible zone set arrangements, resulting in improved performance.

Although some embodiments are described herein in the context of implementing an NVMe-oF or NVMe/TCP storage access protocol in a software-defined storage system or other distributed storage system, it is to be appreciated that other embodiments can be implemented in other types of storage systems using other storage access protocols.

In one embodiment, an apparatus comprises at least one processing device that includes a processor coupled to a memory. The at least one processing device is configured to implement a centralized discovery controller for coupling to a host and to a storage system accessed by the host. The centralized discovery controller is configured to receive, from at least one of the host and the storage system, information indicating a need for an adjustment in at least one zone set, a given such zone set specifying a plurality of endpoints including one or more host endpoints and one or more storage system endpoints, and responsive to the received information, to automatically initiate the adjustment in the at least one zone set.

The host endpoints illustratively comprise respective host initiators, such as respective host bus adaptors (HBAs) or other types of host ports, and the storage system endpoints illustratively comprise respective storage system targets, such as NVM subsystems, although numerous other types of host and storage system endpoints can be used in other embodiments.

The information indicating the need for the adjustment in the at least one zone set is illustratively received in the centralized discovery controller from, for example, a multi-path input-output (MPIO) driver of the host, where the MPIO driver controls delivery of IO operations from the host to the storage system over selected paths.

In some embodiments, the information indicating the need for the adjustment in the at least one zone set comprises a request from the host for the centralized discovery controller to initiate a particular type of adjustment in the at least one zone set. Additionally or alternatively, such a request can come from the storage system.

A wide variety of other types of information indicating a need for adjustment in at least one zone set can be used in other embodiments.

For example, in some embodiments, the information indicating the need for the adjustment in the at least one zone set illustratively comprises at least one Asynchronous Event Notification (AEN) sent from one of the host and the storage system and associated with at least one corresponding Asynchronous Event Request (AER) previously sent by the centralized discovery controller to one of the host and the storage system. Numerous other arrangements of AENs and associated AERs, which may be sent to and/or from various ones of the hosts, the storage system and the centralized discovery controller, can be used in illustrative embodiments herein.

These and other illustrative embodiments include, without limitation, apparatus, systems, methods and processor-readable storage media.

BRIEF DESCRIPTION OF THE DRAWINGS

FIG. 2 is a flow diagram of a process for dynamic adjustment of zone sets in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
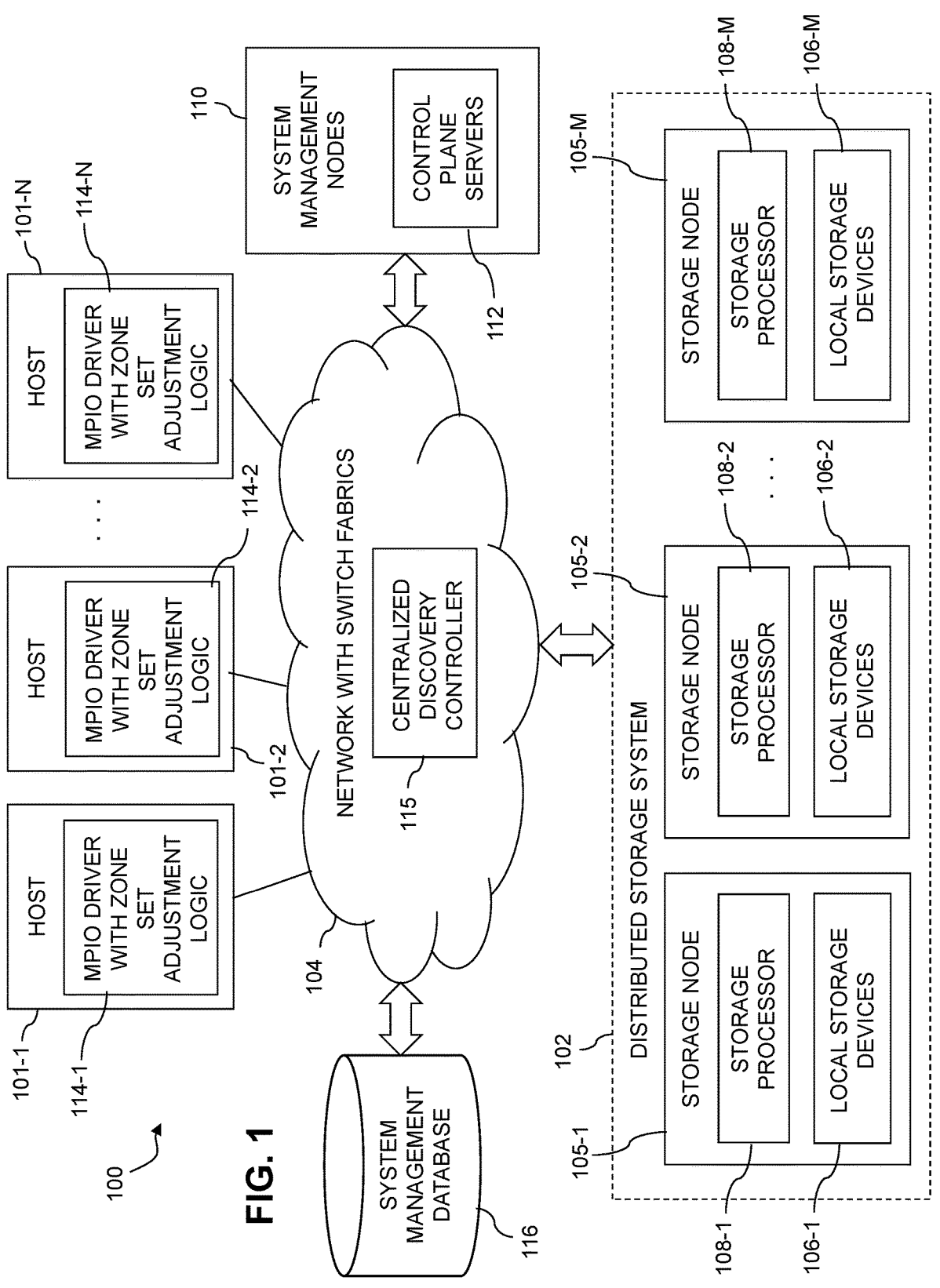
FIG. 1 is a block diagram of an information processing system incorporating functionality for dynamic adjustment of zone sets in an illustrative embodiment.

FIG. 1 shows an information processing system 100 configured in accordance with an illustrative embodiment. The information processing system 100 comprises a plurality of hosts 101-1, 101-2, . . . 101-N, collectively referred to herein as hosts 101, and a distributed storage system 102 shared by the hosts 101. The hosts 101 and distributed storage system 102 in this embodiment are configured to communicate with one another via a network 104 that illustratively utilizes protocols such as Transmission Control Protocol (TCP) and Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

It should be noted that the term "host" as used herein is intended to be broadly construed, so as to encompass, for example, a host device or a host system, each of which may comprise multiple distinct devices of various types. A host in some embodiments can comprise, for example, at least one server, as well as additional or alternative types and arrangements of processing devices.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical identifier (e.g., address) space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments. Examples of such software-defined storage systems will be described in more detail below in conjunction with FIG. 3.

It is to be appreciated, however, that techniques disclosed herein can be implemented in other embodiments in stand-alone storage arrays or other types of storage systems that are not distributed across multiple storage nodes. The disclosed techniques are therefore applicable to a wide variety of different types of storage systems. The distributed storage system 102 is just one illustrative example.

In the distributed storage system 102, each of the storage nodes 105 is illustratively configured to interact with one or more of the hosts 101. The hosts 101 illustratively comprise servers or other types of computers of an enterprise computer system, cloud-based computer system or other arrangement of multiple compute nodes, each associated with one or more system users.

The hosts 101 in some embodiments illustratively provide compute services such as execution of one or more applications on behalf of each of one or more users associated with respective ones of the hosts 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as outstanding IOs that have been admitted by the storage nodes 105 to further processing within the system 100. The storage nodes 105 are illustratively configured to queue IO operations arriving from one or more of the hosts 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms. In the case of separate processing platforms, there may be a single storage node per processing platform or multiple storage nodes per processing platform.

The hosts 101 are illustratively configured to write data to and read data from the distributed storage system 102 comprising storage nodes 105 in accordance with applications executing on those hosts 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) interface cards and/or other types of interfaces of those devices, including, again by way of example, LAN On Motherboard (LOM) network interface cards (NICs) or other types of NICs. Such devices, together with associated host software such as, for example, IO drivers, networking stacks and/or other components, illustratively support networking protocols such as InfiniBand or Fibre Channel, in addition to or in place of TCP/IP. Numerous alternative networking arrangements are possible in a given embodiment, as will be appreciated by those skilled in the art. Additional examples include remote direct memory access (RDMA) over Converged Ethernet (RoCE), illustratively RoCEv2, or RDMA over iWARP.

The first storage node 105-1 comprises a plurality of storage devices 106-1 and an associated storage processor 108-1. The storage devices 106-1 illustratively store metadata and user data associated with one or more storage volumes of the distributed storage system 102. The storage volumes illustratively comprise respective logical units (LUNs) or other types of logical storage volumes (e.g., NVMe namespaces). The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage processor 108-2, and storage node 105-M comprises a plurality of storage devices 106-M and an associated storage processor 108-M.

As indicated previously, the storage devices 106-2 through 106-M illustratively store metadata and user data associated with one or more storage volumes of the distributed storage system 102, such as the above-noted LUNs, NVMe namespaces or other types of logical storage volumes. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node.

The storage processors 108 of the storage nodes 105 may include additional modules and other components typically found in conventional implementations of storage processors and storage systems, although such additional modules and other components are omitted from the figure for clarity and simplicity of illustration.

Additionally or alternatively, the storage processors 108 in some embodiments can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, and spin torque transfer magneto-resistive RAM (STT-MRAM), among numerous other NVM device types known to those skilled in the art. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices of the storage nodes 105 of the distributed storage system of FIG. 1.

In some embodiments, the storage nodes 105 collectively provide a distributed storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the hosts 101 and the storage nodes 105 comprise NVMe commands of an NVMe storage access protocol, for example, as described in the NVM Express Base Specification, Revision 2.0c, October 2022, and its associated NVM Express Command Set Specification and NVM Express TCP Transport Specification, all of which are incorporated by reference herein. Other examples of NVMe storage access protocols that may be utilized in illustrative embodiments disclosed herein include NVMe over Fabrics, also referred to herein as NVMe-oF, and NVMe over TCP, also referred to herein as NVMe/TCP. Other embodiments can utilize other types of storage access protocols. As another example, communications between the hosts 101 and the storage nodes 105 in some embodiments can comprise Small Computer System Interface (SCSI) commands and the Internet SCSI (iSCSI) protocol.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102. Other embodiments can utilize other data protection techniques, such as, for example, Erasure Coding (EC), instead of one or more RAID arrangements.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage processors 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes a plurality of devices, each illustratively a different physical storage device of the storage devices 106. Multiple such physical storage devices are typically utilized to store data of a given LUN, NVMe namespace or other logical storage volume in the distributed storage system. For example, data pages or other data blocks of a given LUN, NVMe namespace or other logical storage volume can be "striped" along with its corresponding parity information across multiple ones of the devices in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using wellknown RAID 5 techniques. The data and parity blocks are distributed over the devices to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the devices to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are illustratively interconnected with one another in a full mesh network, or other topology providing full any-to-any network connectivity, and are collectively managed by a system manager. A given set of local persistent storage devices on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a plurality of system management nodes 110 that are illustratively configured to provide system management functionality of the type noted above. Such functionality in the present embodiment illustratively further involves utilization of control plane servers 112 and a system management database 116. In some embodiments, at least portions of the system management nodes 110 and their associated control plane servers 112 are distributed over the storage nodes 105. For example, a designated subset of the storage nodes 105 can each be configured to include a corresponding one of the control plane servers 112. Other system management functionality provided by system management nodes 110 can be similarly distributed over a subset of the storage nodes 105.

The system management database 116 stores configuration and operation information of the system 100 and portions thereof are illustratively accessible to various system administrators such as host administrators and storage administrators.

The hosts 101-1, 101-2, . . . 101-N include respective MPIO drivers 114-1, 114-2, . . . 114-N, each of which is assumed to comprise zone set adjustment logic as well as path selection logic. The MPIO drivers 114 are illustratively utilized in supporting functionality for dynamic adjustment of zone sets, as described in more detail below.

In some embodiments, each of the storage nodes 105 of the distributed storage system 102 is assumed to comprise multiple controllers associated with a corresponding target of that storage node. Such a "target" as that term is broadly used herein is illustratively a destination end of one or more paths from one or more of the hosts 101 to the storage node, and may comprise, for example, an NVM subsystem of the storage node, although other types of targets can be used in other embodiments. It should be noted that different types of targets may be present in NVMe embodiments than are present in other embodiments that use other storage access protocols, such as SCSI embodiments. Accordingly, the types of targets that may be implemented in a given embodiment can vary depending upon the particular storage access protocol being utilized in that embodiment, and/or other factors. Similarly, the types of initiators can vary depending upon the particular storage access protocol, and/or other factors. Again, terms such as "initiator" and "target" as used herein are intended to be broadly construed, and should not be viewed as being limited in any way to particular types of components associated with any particular storage access protocol.

The paths that are selected by instances of path selection logic in the MPIO drivers 114 of the respective hosts 101 for delivering IO operations from the hosts 101 to the distributed storage system 102 are associated with respective initiator-target pairs, as described in more detail elsewhere herein.

In some embodiments, IO operations are processed in the hosts 101 utilizing their respective MPIO drivers 114 in the following manner. A given one of the hosts 101 establishes a plurality of paths between at least one initiator of the given host and a plurality of targets of respective storage nodes 105 of the distributed storage system 102. For each of a plurality of IO operations generated in the given host for delivery to the distributed storage system 102, the host selects a path to a particular target, and sends the IO operation to the corresponding storage node over the selected path.

The given host above is an example of what is more generally referred to herein as "at least one processing device" that includes a processor coupled to a memory. The storage nodes 105 of the distributed storage system 102 are also examples of "at least one processing device" as that term is broadly used herein.

It is to be appreciated that path selection as disclosed herein can be performed independently by each of the hosts 101, illustratively utilizing their respective MPIO drivers 114 and their corresponding zone set adjustment logic and path selection logic, as indicated above, with possible involvement of additional or alternative system components.

In some embodiments, the initiator of the given host and the targets of the respective storage nodes 105 are configured to support one or more designated standard storage access protocols, such as an NVMe storage access protocol or a SCSI storage access protocol. As more particular examples in the NVMe context, the designated storage access protocol may comprise an NVMe/FC or NVMe/TCP storage access protocol, although a wide variety of additional or alternative storage access protocols can be used in other embodiments.

The hosts 101 can comprise additional or alternative components. For example, in some embodiments, the hosts 101 further comprise respective sets of IO queues associated with respective ones of the MPIO drivers 114. The MPIO drivers 114 collectively comprise a multi-path layer of the hosts 101. Dynamic zone set adjustment functionality and path selection functionality for delivery of IO operations from the hosts 101 to the distributed storage system 102 are provided in the multi-path layer by respective instances of zone set adjustment logic and path selection logic implemented within the corresponding MPIO drivers 114.

The MPIO drivers 114 may comprise, for example, otherwise conventional MPIO drivers, such as PowerPath® drivers from Dell Technologies, suitably modified in the manner disclosed herein to include respective instances of zone set adjustment logic and to provide one or more portions of the disclosed functionality for dynamic adjustment of zone sets.

Other types of MPIO drivers may be suitably modified to incorporate one or more portions of the functionality for dynamic adjustment of zone sets as disclosed herein. These include MPIO drivers implemented using alternative types of multipathing software such as, for example, Microsoft Multipath I/O, VMware native multipathing (NMP), and Linux Device Mapper Multipath (DM-Multipath), each illustratively providing instances of MPIO drivers as that term is broadly used herein.

For example, in some embodiments, the MPIO driver may be implemented at least in part utilizing a pluggable storage architecture (PSA). The PSA is illustratively configured to coordinate multiple multipathing plugins (MPPs), and may be viewed as an example of at least a portion of what is more generally referred to herein as a multi-path layer. Other multi-path layers, including other types of pluggable multi-path layers, can be used in other embodiments. For example, the MPIO driver may be implemented utilizing, for example, a high performance plugin (HPP) or a native multipathing plugin (NMP), although again other types and arrangements of path selection logic can be used.

In some embodiments, the hosts 101 comprise respective local caches, implemented using respective memories of those hosts. A given such local cache can be implemented using one or more cache cards. A wide variety of different caching techniques can be used in other embodiments, as will be appreciated by those skilled in the art. Other examples of memories of the respective hosts 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers 114 are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the hosts 101. For example, IO operations can be generated by each of multiple processes of a database application running on one or more of the hosts 101. Such processes issue IO operations for delivery to the distributed storage system 102 over the network 104. Other types of sources of IO operations may be present in a given implementation of system 100.

A given IO operation is therefore illustratively generated by a process of an application running on a given one of the hosts 101, and is queued in one of the IO queues of the given host with other operations generated by other processes of that application, and possibly other processes of other applications.

The paths from the given host to the distributed storage system 102 illustratively comprise paths associated with respective initiator-target pairs, with each initiator comprising, for example, a port of a single-port or multi-port host bus adaptor (HBA) or other initiating entity of the given host and each target comprising a port or other targeted entity corresponding to one or more of the storage devices 106 of the distributed storage system 102. As noted above, the storage devices 106 illustratively comprise LUNs, NVMe namespaces or other types of logical storage devices.

In some embodiments, the paths are associated with respective communication links between the given host and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

Accordingly, in some embodiments, multiple virtual initiators are associated with a single HBA of a given one of the hosts 101 but have respective unique identifiers associated therewith.

Additionally or alternatively, different ones of the multiple virtual initiators are illustratively associated with respective different ones of a plurality of virtual machines of the given host that share a single HBA of the given host, or a plurality of logical partitions of the given host that share a single HBA of the given host.

Numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host in delivering IO operations from the IO queues of that host to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. For example, in the case of write requests, such commands are assumed to have various payload sizes associated therewith, and the payload associated with a given command may be referred to as its "command payload." Other arrangements are used for read requests, with the payload moving in the opposite direction.

A command directed by the given host to the distributed storage system 102 is considered an "outstanding" command until such time as its execution is completed in the viewpoint of the given host, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte SCSI logical blocks or other sizes and/or structures of logical blocks. Other command formats, e.g., Submission Queue Entry (SQE), are utilized in the NVMe context.

In illustrative embodiments to be described below, it is assumed without limitation that the initiators of a plurality of initiator-target pairs comprise or are otherwise associated with respective ports of the given host and that the targets of the plurality of initiator-target pairs comprise or are otherwise associated respective ports of the distributed storage system 102, although numerous other initiator-target arrangements are possible, and such terms are therefore intended to be broadly construed herein, and should not be viewed as limited to particular interface types, such as SCSI or NVMe interfaces. Non-limiting examples of host ports and storage array ports are illustrated in conjunction with the embodiment of FIG. 3. The host ports can comprise, for example, ports of single-port HBAs and/or ports of multiport HBAs, or other types of host ports, including NICs. Again, a wide variety of other types and arrangements of initiators and targets can be used in other embodiments.

Selecting a particular one of multiple available paths for delivery of a selected one of the IO operations from the given host is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume (e.g., an NVMe namespace) to which the particular IO operation is directed.

It should be noted that paths may be added or deleted between the hosts 101 and the distributed storage system 102 in the system 100. For example, the addition of one or more new paths from the given host to the distributed storage system 102 or the deletion of one or more existing paths from the given host to the distributed storage system 102 may result from respective addition or deletion of at least a portion of the storage devices 106 of the distributed storage system 102.

Addition or deletion of paths can also occur as a result of zoning and masking changes or other types of storage system reconfigurations, which may be performed by a storage administrator or other user. Some embodiments are configured to send a predetermined command from the given host to the distributed storage system 102, illustratively utilizing the MPIO driver, to determine if zoning and masking information has been changed. The predetermined command can comprise, for example, in the SCSI context, a log sense command, a mode sense command, a "vendor unique command" or VU command, or combinations of multiple instances of these or other commands, in an otherwise standardized command format. Analogous NVMe commands include Get Log Page and Get Features commands.

In some embodiments, paths are added or deleted in conjunction with, for example, load rebalancing among storage nodes, or under other conditions such as addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths. Such path discovery is illustratively implemented at least in part through interaction with a centralized discovery controller or CDC.

Additionally or alternatively, a given path discovery scan can be performed utilizing known functionality of conventional MPIO drivers, such as PowerPath® drivers.

The path discovery scan in some embodiments may be further configured to identify one or more new LUNs, NVMe namespaces or other logical storage volumes associated with the one or more new paths identified in the path discovery scan. The path discovery scan may comprise, for example, one or more scans that are configured to discover the appearance of any new LUNs or NVMe namespaces that have been added to the distributed storage system 102 as well to discover the disappearance of any existing LUNs or NVMe namespaces that have been deleted from the distributed storage system 102.

The MPIO driver of the given host in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an operating system kernel of the given host.

For each of one or more new paths identified in the path discovery scan, the given host may be configured to execute a host registration operation for that path. The host registration operation for a given new path illustratively provides notification to the distributed storage system 102 that the given host has discovered the new path.

As indicated previously, the storage nodes 105 of the distributed storage system 102 process IO operations from one or more hosts 101 and in processing those IO operations run various storage application processes that generally involve interaction of that storage node with one or more other ones of the storage nodes.

In the FIG. 1 embodiment, the distributed storage system 102 comprises storage processors 108 and corresponding sets of storage devices 106, and may include additional or alternative components, such as sets of local caches.

The storage processors 108 illustratively control the processing of IO operations received in the distributed storage system 102 from the hosts 101. For example, the storage processors 108 illustratively manage the processing of read and write commands directed by the MPIO drivers of the hosts 101 to particular ones of the storage nodes 105. This processing illustratively includes, for example, a given one of the storage processors 108 on a given one of the storage nodes 105 directing read requests and/or write requests received from one or more of the hosts 101 to local storage devices on the given storage node and/or local storage devices on one or more other ones of the storage nodes 105.

The storage processors 108 can be implemented as respective storage controllers, directors or other storage system components configured to control storage system operations relating to processing of IO operations. In some embodiments, each of the storage processors 108 has a different one of the above-noted local caches associated therewith, although numerous alternative arrangements are possible.

The manner in which functionality for dynamic adjustment of zone sets is implemented in system 100 will now be described in more detail.

As indicated previously, in many distributed storage systems, including software-defined storage system arrangements utilizing advanced storage access protocols such as NVMe-oF or NVMe/TCP, it can be difficult to configure and adjust zone sets without the need for excessive manual intervention by storage administrators or other users.

Illustrative embodiments disclosed herein address and overcome these and other issues of conventional practice by providing techniques for dynamic adjustment of zone sets in a multi-path layer of hosts 101 and/or in distributed storage system 102 through interaction with centralized discovery controller 115. Such a centralized discovery controller is sometimes referred to elsewhere herein as a CDC. The centralized discovery controller 115 in some embodiments is implemented, for example, in a switch fabric of network 104 through which the hosts 101 communicate with distributed storage system 102.

Such techniques advantageously facilitate the usage of advanced storage access protocols such as NVMe-oF or NVMe/TCP while avoiding the above-described drawbacks of conventional practice. For example, some embodiments can substantially eliminate or otherwise alleviate the need for manual intervention, thereby providing significantly more flexible zone set arrangements, resulting in improved performance.

In some embodiments, the centralized discovery controller 115 is implemented at least in part as a network device or software component that is responsible for discovering NVMe-oF endpoints (e.g., hosts and storage subsystems) and then managing access control in a centralized manner using Discovery Log Pages. It is typically used in large enterprise networks, data centers, or cloud environments where there are many network devices and endpoints that need to be managed. The centralized discovery controller 115 in some embodiments maintains a real-time map of NVMe Qualified Names (NQNs), Internet Protocol (IP) Addresses, device type, and/or other relevant information for each of the endpoints.

Such an arrangement is advantageous in that it simplifies the management and troubleshooting of the system 100 by providing a centralized view of the network topology and device locations. It also enables network automation and orchestration by providing a single point of control for network devices. Additionally, it can improve network security by identifying unauthorized devices on the network and enforcing network access policies using zoning. Zoning illustratively includes the partitioning of a network fabric into smaller subsets to restrict interference, add security, and to simplify management. Zoning may be viewed as a way of grouping devices in a SAN based on their physical or logical connections so that boundaries are created which isolate traffic and prevent unauthorized access. These grouped devices are examples of what are more generally referred to herein as "endpoints," and the corresponding group is an example of what is more generally referred to herein as a "zone set." A given zone set therefore illustratively comprises a set of devices or other endpoints, such as host initiators and storage system targets, that are permitted to communicate with one another within a corresponding system boundary. For example, such endpoints are illustratively zoned together into a common zone set for access to data associated with one or more logical storage volumes. It is to be appreciated, however, that terms such as "endpoint" and "zone set" as used herein are intended to be broadly construed, and should not be viewed as being limited to any particular arrangements used in the illustrative embodiments.

Direct discovery for NVMe/TCP-based SANs illustratively provides manual configuration of a host to a specific target subsystem. This process can be acceptable in smaller fabrics with a few dozen host and storage endpoints. However, manual configuration and discovery of each storage subsystem on a host can quickly become difficult and error prone for administrators as fabrics scale.

The centralized discovery controller 115 in some embodiments provides a discovery mechanism that a host can use to automatically determine which storage subsystems on the fabric the host can access. For example, the centralized discovery controller 115 illustratively allows a given one of the hosts 101 to discover a list of NVM subsystems with namespaces that are accessible to the host, an NVM subsystem to discover a list of NVMe enabled-hosts that are on the fabric, a host to discover multiple paths to an NVM subsystem, and a host to discover storage controllers that are statically configured.

The centralized discovery controller 115 illustratively provides all the functions of a discovery controller on the storage subsystems on the fabric, along with its own discovery log that collects data about the hosts and subsystems on the fabric. For example, the centralized discovery controller 115 can provide a single point of contact for hosts and storage subsystems to use to discover each other on the fabric. Rather than manually configuring each host to point to each subsystem, an administrator or other user can configure hosts and subsystems to point to the IP address of the centralized discovery controller 115. The centralized discovery controller 115 illustratively then acts as broker for the communication between them. In some embodiments, the centralized discovery controller 115 is implemented at least in part as a software-based entity that runs as a VM or as an embedded container on a fabric, although numerous other implementations can be used.

As will be described in more detail below, the centralized discovery controller 115 is illustratively configured to facilitate dynamic adjustment of zone sets in the system 100, through interaction with the MPIO drivers 114 of the hosts 101 and the storage nodes 105 of the distributed storage system 102.

Although some embodiments are described herein in the context of implementing an NVMe-oF or NVMe/TCP storage access protocol in a software-defined storage system or other distributed storage system, it is to be appreciated that other embodiments can be implemented in other types of storage systems using other storage access protocols.

Also, although the disclosed techniques are advantageous for certain types of host environments, such as VMware virtual machine environments in data centers or other cloud-based systems that utilize ESXi servers, the disclosed techniques are applicable to a wide variety of other host environments utilizing other types of operating systems and/or hypervisors.

As mentioned above, each of the storage nodes 105 of the distributed storage system 102 illustratively comprises one or more targets, where each such target is associated with multiple distinct paths from respective HBAs or other initiators of one or more of the hosts 101.

For example, in some embodiments, one or more of the storage nodes 105 each implements at least one target, such as an NVMe target as further described herein, that is configured to include multiple controllers, such as at least a first controller associated with a first storage pool, and a second controller associated with a second storage pool. The first and second storage pools are illustratively storage pools of the distributed storage system 102, and such storage pools may be distributed across multiple ones of the storage nodes 105. Each of the first and second storage pools is assumed to comprise one or more LUNs, NVMe namespaces or other logical storage volumes.

Although first and second controllers are referred to in conjunction with some embodiments herein, it is to be appreciated that more than two controllers can be implemented in a given target in order to support more than two storage pools.

A given one of the storage nodes 105 illustratively processes IO operations received from one or more of the hosts 101, with different ones of the IO operations being directed by the one or more hosts 101 from one or more initiators of the one or more hosts 101 to different ones of a plurality of targets implemented within the storage nodes.

The dynamic adjustment of zone sets in such an embodiment is illustratively implemented in the following manner.

A given one of the hosts 101, illustratively at least in part via its corresponding one of the MPIO drivers 114, interacts with centralized discovery controller 115 in implementing aspects of the dynamic adjustment of zone sets.

For example, the centralized discovery controller 115 in some embodiments is configured to receive, illustratively from the MPIO driver of the given host, or possibly from at least one of the storage nodes 105 of the distributed storage system 102, information indicating a need for an adjustment in at least one zone set, and responsive to the received information, to automatically initiate the adjustment in the at least one zone set.

A given such zone set illustratively specifies a plurality of endpoints including one or more host endpoints and one or more storage system endpoints. The host endpoints illustratively comprise respective host initiators, such as respective HBAs or other types of host ports, and the storage system endpoints illustratively comprise respective storage system targets, such as NVM subsystems, although numerous other types of host and storage system endpoints can be used in other embodiments.

The one or more switch fabrics of the network 104 that implement at least portions of the centralized discovery controller 115 are considered examples of what are more generally referred to herein as "at least one processing device" comprising a processor coupled to a memory. Other types and arrangements of at least one processing device can be used to implement the centralized discovery controller 115. For example, the centralized discovery controller 115 can additionally or alternatively be deployed on at least one of the system management nodes 110 and/or on one or more servers or other components of the system 100.

In some embodiments, the centralized discovery controller 115 is further configured to identify particular targets of the distributed storage system 102 that are accessible to the host. Such target discovery functionality can be implemented at least in part in accordance with the NVMe specification documents cited elsewhere herein, although it is to be appreciated that utilization of NVMe is not a requirement in illustrative embodiments.

As indicated previously, the above-noted information indicating the need for the adjustment in the at least one zone set is illustratively received in the centralized discovery controller 115 from an MPIO driver of the given host. In such embodiments, the information indicating the need for the adjustment in the at least one zone set is illustratively generated by the MPIO driver based at least in part on an issue detected by the MPIO driver. For example, the issue detected by the MPIO driver may comprise one or more of a loss of at least a threshold number of connections between one or more host endpoints and one or more storage system endpoints, at least a threshold amount of change in a workload of at least one application executing on the host, and at least a threshold amount of performance degradation associated with one or more fabric performance impact notifications (FPINs) relating to a SAN over which the host communicates with the storage system. Numerous additional or alternative types of issues can be detected by the MPIO driver in other embodiments.

In some embodiments, the MPIO driver of the given host illustratively maintains performance measurements for IO operations that it sends to the distributed storage system 102 over the network 104. These can include performance measurements based at least in part on response time and/or other performance metrics such as IO operations per second (IOPS) and throughput.

For example, the MPIO driver can monitor round-trip latency by, periodically or under other specified conditions, measuring response time of IO operations on each path between the hosts 101 and the distributed storage system 102. An increase in response time above a designated threshold relative to one or more previous measurements can indicate a potential performance issue. Other significant changes in performance measurements over time can be used to indicate actual or potential performance issues. Similarly, improvements in performance measurements over time, detected by the MPIO driver of the given host can indicate the resolution of a previously-detected performance issue.

In some embodiments, the MPIO driver is configured to read storage-side performance measurements from the storage nodes 105 of the distributed storage system 102, illustratively on a per-path basis, using commands directed to those storage nodes 105. Such storage-side performance measurements are illustratively utilized by the MPIO driver to eliminate the possibility that a detected degradation based on its own host-side performance measurements may be due to a processing slowdown in one or more of the storage nodes 105. For example, if storage-side performance measurements read from a given storage node are unchanged over time but the host-side performance measurements indicate a substantial degradation in IO latency, the issue is most likely network congestion.

Accordingly, the MPIO driver in illustrative embodiments utilizes its host-side performance measurements, possibly in conjunction with storage-side performance measurements read from the storage nodes 105, to detect an actual or potential performance issue involving at least one switch fabric of the network 104.

The detection of such an issue by the MPIO driver illustratively causes the MPIO driver or another host component to generate the above-noted information indicating the need for the adjustment in the at least one zone set.

Such information in some embodiments comprises a request from the host for the centralized discovery controller 115 to initiate a particular type of adjustment in the at least one zone set. The particular type of adjustment may comprise, for example, at least one of an addition of at least one endpoint to a given zone set and a deletion of at least one endpoint from the given zone set.

In some embodiments, the request for the centralized discovery controller 115 to initiate a particular type of adjustment in the at least one zone set comprises at least one command sent from the MPIO driver of the host utilizing a particular storage access protocol, such as an NVMe storage access protocol. Such a command may more particularly comprise, for example, a VU command of the type mentioned elsewhere herein.

Additionally or alternatively, the request for the centralized discovery controller 115 to initiate a particular type of adjustment in the at least one zone set illustratively comprises a request to modify a status of at least one endpoint from a configured status to an active status for the at least one zone set. For example, in such an embodiment, the centralized discovery controller 115 illustratively maintains, for a given zone set, a set of active endpoints for the given zone set and a set of configured endpoints for the given zone set, where the set of configured endpoints includes endpoints that are configured for potential inclusion in the given zone set but are not yet activated for the given zone set. The centralized discovery controller 115 may initially activate the given zone set with a specified minimum set of active endpoints, and the set of configured endpoints can include additional endpoints that if activated by the centralized discovery controller 115 would provide a specified maximum set of activated endpoints.

In some embodiments, the above-noted information indicating the need for the adjustment in the at least one zone set comprises a request from the distributed storage system 102 for the centralized discovery controller 115 to initiate a particular type of adjustment in the at least one zone set.

The information indicating the need for the adjustment in the at least one zone set may additionally or alternatively comprise at least one Asynchronous Event Notification (AEN) sent from one of the host and the storage system and associated with at least one corresponding Asynchronous Event Request (AER) previously sent by the centralized discovery controller 115 to one of the host and the storage system.

For example, an AEN may be sent from one of the storage nodes 105 of the distributed storage system 102 to the centralized discovery controller 115 to indicate a detected condition relating to one or more storage system endpoints that will adversely impact one or more connections between the host and the storage system.

In response to receipt of such an AEN from the storage system, the centralized discovery controller 115 automatically initiates the adjustment in the at least one zone set at least in part by sending an AEN to the host. The host, responsive to receipt of the AEN from the centralized discovery controller 115, illustratively sends a Get Log Page command to the centralized discovery controller 115 to determine one or more new endpoints to which it should connect to alleviate the detected condition. Such a command is an example of what is more generally referred to herein as a log page command. Numerous other arrangements of AENs and associated AERs, which may be sent to and/or from various ones of the hosts 101, the distributed storage system 102 and the centralized discovery controller 115, can be used in illustrative embodiments herein.

Also, a wide variety of other types of information indicating a need for adjustment in at least one zone set can be provided from at least one of a host and a storage system to centralized discovery controller 115 in other embodiments.

The host and/or one or more storage nodes of the distributed storage system 102 in this embodiment may each also be viewed as an example of what is more generally referred to herein as "at least one processing device" comprising a processor and a memory, with the processor coupled to the memory. Other arrangements of one or more processing devices can be configured to implement at least portions of the disclosed functionality for dynamic adjustment of zone sets in other embodiments.

As indicated previously, the host illustratively comprises a plurality of initiators and supports one or more paths between each of the initiators and one or more targets on each of the storage nodes.

It should be noted that the term "path" as used herein is intended to be broadly construed, and should not be viewed as limited to particular path types associated with particular interfaces such as NVMe or SCSI. For example, in some embodiments, a path may be associated with an initiator-target pair, also referred to in some embodiments as an initiator-target nexus or an IT nexus, and/or a particular LUN, NVMe namespace or other logical storage volume, also referred to in some embodiments as an ITL nexus. Paths in some embodiments may comprise, for example, NVMe associations. Other types and arrangements of paths may be used in other embodiments disclosed herein.

In some embodiments, the target of a given initiator-target pair providing a path from a host to a given storage node comprises an NVMe controller, although a wide variety of other types of targets can be used in other embodiments. The term "target" as used herein in the context of a distributed storage system or other type of storage system is therefore intended to be broadly construed.

The target in some embodiments more particularly comprises one or more controllers accessible via respective different associations comprising one or more TCP connections between the given host and the given storage node. For example, the target may comprise a plurality of NVMe controllers of an NVM subsystem that is at least partially resident on the given storage node.

Accordingly, in some embodiments, multiple controllers are part of a single physical controller component of the given storage node. For example, first and second controllers may comprise respective NVMe controllers of an NVM subsystem that is at least partially resident on the given storage node. Such components may be viewed as examples of what are more generally referred to herein as a "target" of the given storage node. Other types of targets comprising one or more controllers can be used in other embodiments.

The first and second controllers in some embodiments may be viewed as comprising respective "virtual" controllers associated with the single physical controller component of the given storage node.

Additionally or alternatively, the first and second controllers in some embodiments are accessible via respective first and second different associations comprising one or more TCP connections between a given one of the one or more hosts 101 and the given storage node. In such an arrangement, a host accesses the first controller using the first association, and accesses the second controller using the second association. Other types of communication links can be used in other embodiments.

In some embodiments, the first controller comprises a first set of IO queues and the second controller comprises a second set of IO queues, for use in processing IO operations for their respective storage pools. Other types of queues, such as, for example, Admin queues, can additionally or alternatively be used.

An additional example of an illustrative process for implementing at least some of the above-described functionality for dynamic adjustment of zone sets will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

Also, the term "storage volume" as used herein is intended to be broadly construed, and should not be viewed as being limited to any particular format or configuration.

In some embodiments, the storage nodes 105 are implemented using processing modules that are interconnected, for example, in a full mesh network or other topology providing full any-to-any network connectivity, such that a process of one of the processing modules can communicate with processes of any of the other processing modules. Commands issued by the processes can include, for example, remote procedure calls (RPCs) and/or application programming interface (API) invocations directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in a full mesh network or other topology providing full any-to-any network connectivity, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RoCEv2. For example, respective sets of IP links used in data transfer and corresponding messaging could be associated with respective different ones of the routing modules.

The particular features described above in conjunction with FIG. 1 should not be construed as limiting in any way, and a wide variety of other system arrangements implementing dynamic adjustment of zone sets as disclosed herein are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated hosts 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the hosts 101 and the storage nodes 105 to reside in different data centers. Numerous other distributed implementations of the storage nodes 105 and their respective associated sets of hosts 101 are possible.

Additional examples of processing platforms utilized to implement storage systems and possibly their associated hosts in illustrative embodiments will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components such as hosts 101, distributed storage system 102, storage nodes 105, storage devices 106, storage processors 108, system management nodes 110 and MPIO drivers 114 can be used in other embodiments. For example, as mentioned previously, system management functionality of system management nodes 110 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of the functionality for dynamic adjustment of zone sets as disclosed herein can be implemented in one or more hosts, in a storage system, or partially in a host and partially in a storage system. Accordingly, illustrative embodiments are not limited to arrangements in which functionality for dynamic adjustment of zone sets is implemented primarily in storage system or primarily in a particular host or set of hosts, and therefore such embodiments encompass various alternative arrangements, such as, for example, an arrangement in which the functionality is distributed over one or more storage systems and one or more associated hosts, each comprising one or more processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for dynamic adjustment of zone sets as disclosed herein. This process may be viewed as an example algorithm implemented at least in part by one or more of the hosts 101 interacting with distributed storage system 102 via centralized discovery controller 115. These and other algorithms for dynamic adjustment of zone sets as disclosed herein can be implemented using other types and arrangements of system components in other embodiments.

The process illustrated in FIG. 2 includes steps 200 through 206, and is assumed to be implemented through interaction of a host, a centralized discovery controller and a storage system. The host-side portions of the process are more particularly assumed to be performed by an MPIO driver of a given host, such as one of the MPIO drivers 114 in one of the hosts 101 of the system 100, utilizing zone set adjustment logic deployed in the MPIO driver and configured to support interaction with the centralized discovery controller 115. Similar processes may be implemented primarily by interaction between other MPIO drivers of respective other hosts and the centralized discovery controller 115, and may also be implemented at least in part utilizing additional or alternative host drivers and/or other system components.

It should again be noted that the term "path" as used in this embodiment and other embodiments herein is intended to be broadly construed, and should not be viewed as limited to particular path types associated with particular interfaces such as NVMe or SCSI. For example, a given path can comprise or be otherwise associated with an IT nexus and/or an ITL nexus, or additional or alternative arrangements, and the disclosed embodiments are not limited in this regard.

In step 200, a centralized discovery controller is deployed between one or more hosts, each comprising one or more initiators, and a storage system comprising a plurality of targets. As indicated above, the centralized discovery controller may be centralized discovery controller 115 of system 100, which is configured for coupling to the hosts 101 and to the storage nodes 105 of the distributed storage system 102 via the one or more switch fabrics of the network 104. For example, the centralized discovery controller 115 may be implemented at least in part on at least a portion of a particular switch fabric over which a given one of the hosts communicates with the storage system. The centralized discovery controller is illustratively configured to identify particular targets of the storage system that are accessible to the host. Accordingly, in some embodiments, the given host communicates with the centralized discovery controller to obtain information regarding accessible targets of the storage system, rather than obtaining such information through interaction with each of the individual storage nodes. The centralized discovery controller in such embodiments therefore relieves the given host of the processing burden it would otherwise experience if it were required to conduct the target discovery on its own. Although the centralized discovery controller in some embodiments is configured in accordance with the NVMe storage access protocol, it is to be appreciated that utilization of the NVMe storage access protocol is not required in other embodiments, and the term "centralized discovery controller" as used herein is intended to be broadly construed.

In step 202, an MPIO driver of the given host detects a need for an adjustment in at least one zone set, where, as indicated previously, a given such zone set illustratively comprises one or more host endpoints and one or more storage system endpoints that are zoned together for access to data of one or more logical storage volumes. Such a need may be detected by the MPIO driver detecting a performance issue or other type of issue in the manner described in more detail elsewhere herein. For example, a performance issue may be detected by the MPIO driver utilizing response time measurements and/or other performance measurements made for IO operations that the MPIO driver sends to the storage system for processing. The detection of a performance issue by the MPIO driver can additionally or alternatively include the MPIO driver reading storage-side performance measurements from the storage system, and illustratively utilizing the storage-side performance measurements, in conjunction with its own host-side performance measurements, in the detection of a performance issue. For example, if the storage-side performance measurements are substantially unchanged over a time period during which a spike in host-side performance measurements is detected, the issue likely involves congestion in the network over which the host communicates with the storage system. Numerous other types of issues indicative of a need for an adjustment in at least one zone set can be detected by the MPIO driver, in accordance with the techniques disclosed herein. The MPIO driver responsive to such detection sends corresponding indicating information to the centralized discovery controller.

In step 204, the centralized discovery controller receives from the MPIO driver the information indicating the need for the adjustment in the at least one zone set. Such indicating information can take on any number of different formats, and the term "information indicating a need for an adjustment in at least one zone set" as used herein is therefore intended to be broadly construed.

In step 206, responsive to received information, the centralized discovery controller automatically triggers or otherwise initiates the adjustment in the at least one zone set. For example, the centralized discovery controller can initiate communication with at least one of the host and the storage system, illustratively utilizing AENs associated with respective AERs. A wide variety of additional or alternative communications, notifications or other messages can be used in other embodiments. Also, it should be noted that the indicating information received from the MPIO driver in the centralized discovery controller need not provide details of a particular type of adjustment, but can instead simply provide sufficient information from which the centralized discovery controller can infer that an adjustment in at least one zone set is desirable or otherwise needed.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations for implementing dynamic adjustment of zone sets for one or more hosts interacting with a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for respective different hosts.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

One or more hosts and/or one or more storage nodes can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Hosts, storage processors and other system components may be implemented at least in part using processing devices of such processing platforms. For example, respective path selection logic instances and other related logic instances of the hosts can be implemented in respective virtual machines running on respective ones of the processing devices of a processing platform.

Figure 3:
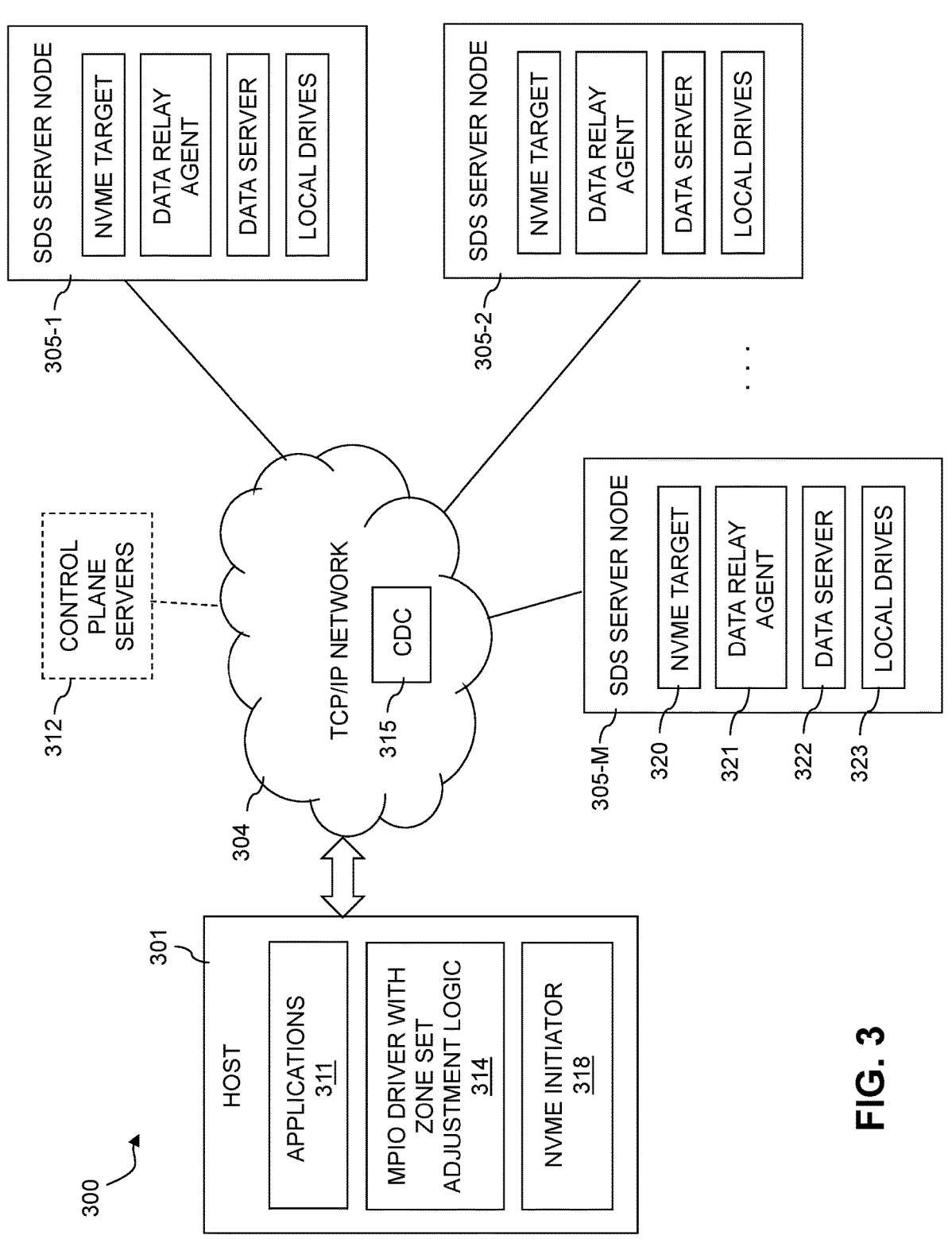
FIG. 3 shows an example of an information processing system comprising a software-defined storage system and incorporating functionality for dynamic adjustment of zone sets in an illustrative embodiment.

FIG. 3 illustrates an example of a distributed storage system that more particularly comprises a software-defined storage system having a plurality of software-defined storage server nodes, also referred to as SDS server nodes, configured to utilize an NVMe storage access protocol such as NVMe-oF or NVMe/TCP. Such SDS server nodes are examples of "storage nodes" as that term is broadly used herein. As will be appreciated by those skilled in the art, similar embodiments can be implemented without the use of software-defined storage and with other storage access protocols.

As shown in FIG. 3, an information processing system 300 comprises a host 301 configured to communicate over a network 304, illustratively a TCP/IP network, with a software-defined storage system comprising a plurality of SDS server nodes 305-1, 305-2, . . . 305-M and corresponding control plane servers 312. The control plane servers 312 are shown in dashed outline as the functionality of such servers in illustrative embodiments is distributed over a particular subset of the SDS server nodes 305 rather than being implemented on separate nodes of the software-defined storage system. The control plane servers 312 provide system management functionality such as centralized storage provisioning, monitoring, membership management, as well as storage partitioning. The system 300 further includes a CDC 315 that is able to communicate with the host 301 and each of the SDS server nodes 305.

A plurality of applications 311 execute on the host 301 and generate IO operations that are delivered to particular ones of the SDS server nodes 305 via at least one NVMe initiator 318. The host 301 further comprises an MPIO driver 314 that includes zone set adjustment logic illustratively configured to carry out aspects of functionality for dynamic adjustment of zone sets of the host 301 in a manner similar to that previously described. For example, the zone set adjustment logic is illustratively implemented as a component of the MPIO driver 314, configured to obtain performance measurements, to detect performance issues based on the performance measurements, and to send corresponding information indicating a need for an adjustment in at least one zone set to the CDC 315 that is illustratively implanted in the TCP/IP network 304. In other embodiments, the zone set adjustment logic may be a separate component of the host 301, rather than part of the MPIO driver 314 as illustrated in the embodiment shown in the figure. Also, although only a single host 301 is shown by way of illustrative example in system 300, the system 300 can include multiple hosts, each configured as generally shown for host 301, as in the system 100 of FIG. 1. One or more additional instances of the CDC 315 may also be included, in some embodiments.

An example algorithm that may be implemented at least in part by the zone set adjustment logic of MPIO driver 314 through interaction with the CDC 315 and possibly other system components will be described below.

Each of the SDS server nodes 305 in the present embodiment comprises at least one NVMe target 320, a data relay agent 321, a data server 322 and a set of local drives 323. The internal components of a given SDS server node with the exception of the local drives 323 are illustratively part of a corresponding storage processor in the FIG. 1 embodiment, although numerous other arrangements are possible.

It should also be noted that the local drives 323, although illustratively shown by way of example only as being part of their respective corresponding SDS server nodes 305, can instead be implemented in whole or in part externally to the SDS server nodes 305. Such SDS server nodes, and other storage nodes referred to herein, need not physically contain local drives, but can instead be coupled to or otherwise associated with such local drives.

The data relay agent 321 facilitates relaying of IO requests between different ones of the SDS server nodes 305, and the data servers 322 provide access to data stored in the local drives 323 of their respective SDS server nodes 305. Additional or alternative components may be included in the SDS server nodes 305 in illustrative embodiments.

Although single NVMe initiators and targets are shown in respective ones of the host 301 and the SDS server nodes 305, this is by way of simplified illustration only, and other embodiments can include multiple NVMe initiators within host 301 and multiple NVMe targets within each of the SDS server nodes 305.

In some embodiments, the SDS server nodes 305 are configured at least in part as respective PowerFlex® software-defined storage nodes from Dell Technologies, although other types of storage nodes can be used in other embodiments. These and other storage nodes can be modified in some embodiments to implement aspects of the disclosed functionality.

The NVMe targets 320 in some embodiments collectively comprise an NVM subsystem that implements multiple distinct controllers. For example, a given such NVMe target can comprise at least a first controller associated with a first storage pool of the distributed storage system, and a second controller associated with a second storage pool of the distributed storage system. Other types and arrangements of single or multiple controllers can be used, and the term "controller" as used herein is intended to be broadly construed, and should not be viewed as being limited to any particular interface type, such as NVMe or SCSI.

Also, the term "NVMe target" as used herein is intended to be broadly construed, to encompass, for example, any component that is a target of an NVMe command. Moreover, as indicated previously, terms such as "target" and "path" as used herein should not be viewed as being limited to any particular interface type, such as NVMe or SCSI.

A given one of the SDS server nodes 305 processes IO operations received from the host 301, with different ones of the IO operations being directed by the host 301 from NVMe initiator 318 to different ones of the first and second controllers of the NVMe target 320 of the given SDS server node.

In some embodiments, the host 301 communicates with the SDS server nodes 305 via a plurality of TCP associations including at least a first TCP association and a second TCP association, although other communication arrangements can be used. A given such "TCP association" as that term is broadly used herein illustratively comprises one or more TCP connections of an association between a host and a controller. For example, an association between a host and a controller may comprise multiple TCP connections, one for an Admin Queue and one for each of a plurality of IO queues.

The NVMe targets 320 in some embodiments comprise respective NVM subsystems. The NVM subsystem is an example of what is more generally referred to herein as a "target" of the storage system, and each of the SDS server nodes 305 can include multiple such targets, each illustratively implemented as a separate NVM subsystem.

The NVM subsystem in some embodiments comprises at least a first controller and a second controller, with the first and second controllers being associated with respective distinct storage pools of the storage system. In other embodiments, the NVM subsystem can comprise more than two controllers, each associated with one or more storage pools. Accordingly, other embodiments can include only a single storage pool, or can involve different associations between multiple controllers and multiple storage pools. The NVM subsystem in the present embodiment is illustratively a single physical controller component of the storage system, and the first and second controllers may be viewed as comprising respective virtual controllers associated with that single physical controller component, although numerous other arrangements are possible in other embodiments.

The storage system processes IO operations received from the host 301 via the TCP associations. For example, the host 301 illustratively directs IO operations from the NVMe initiator 318 to the first controller via the first TCP association, and directs IO operations from the NVMe initiator to the second controller via the second TCP association. The first and second controllers may comprise respective first and second sets of IO queues. Also the above-noted TCP associations are in the context of NVMe/TCP, the disclosed techniques are more broadly applicable to other contexts, including by way of example other NVMe-OF transport contexts, such as FC and RDMA.

The capacities of the first and second sets of IO queues of the respective first and second controllers may be made different from one another by configuring those first and second sets of IO queues to have at least one of a different number of IO queues and a different IO queue size relative to one another, although in other embodiments the first and second sets of IO queues may have the same capacity.

In some embodiments, the NVMe targets 320, each illustratively comprising one or more NVM subsystems, may be configured as a software-defined target or SDT of the software-defined storage system. Such a target can be implemented at least in part as a Linux user space component, illustratively comprising a daemon listening for incoming TCP connections from one or more NVMe initiators 318 of the host 301. The NVMe target comprising a given NVM subsystem is illustratively accessible from the host 301 via one or more TCP associations, each of which may be associated with a different one of the above-noted first and second controllers of the NVM subsystem.

Information indicating a need for an adjustment in at least one zone set, illustratively generated by or under the control of the zone set adjustment logic of the MPIO driver 314, is sent to the CDC 315 and processed in a manner similar to that described elsewhere herein, to automatically initiate the adjustment in the at least one zone set, without requiring manual intervention by a storage administrator or other system user.

These and other features of illustrative embodiments are presented by way of example only, and can be varied in other embodiments. For example, the disclosed techniques for dynamic adjustment of zone sets can be implemented using additional or alternative components of one or more hosts, at least one centralized discovery controller, and a distributed storage system or other type of storage system.

In some embodiments, dynamic activation of zone sets is implemented in Smart Fabric Storage Software (SFSS) from Dell Technologies, or other types of storage system software, with the dynamic activation being performed at least in part responsive to host and/or application demand and possibly additional or alternative criteria. These and other embodiments disclosed herein provide functionality for dynamically zoned endpoints that can significantly improve storage system performance.

Under typical conventional practice, storage administrators use a zoning mechanism to create a zone set which logically groups host endpoints and storage endpoints together to restrict access to storage resources. A given such zone set illustratively comprises a static binding of endpoints, where the endpoints may include, for example, respective host and storage interfaces. However, SAN fabric issues can lead to disruptions in the amount of SAN bandwidth available to a given host application. Also, the amount of SAN bandwidth required by the given host application can vary considerably over time, due to application workload and/or other factors, potentially leading to significantly increased bandwidth demand which may be temporary or permanent depending upon the type of application.

Addressing such changes in bandwidth demand often requires storage administrators to manually adjust the zone sets, for example, by adding one or more storage interfaces to each of one or more of the zone sets in order to address an increased bandwidth demand from a given host application. However, such increases in host application bandwidth demand may be temporary, leading to potential over-provisioning once the temporarily increased demand has returned to normal levels. These and other aspects of conventional practice can result in adverse storage system performance impacts, excessive manual adjustments by storage administrators, and other significant drawbacks.

As indicated previously, illustrative embodiments disclosed herein address and overcome such drawbacks by providing techniques for dynamic activation of zone sets responsive to changes in host and/or application bandwidth demands. Such arrangements allow a given endpoint to be dynamically added to or removed from a zone set, without the need for manual intervention from a storage administrator or other user.

In some embodiments, the disclosed techniques are implemented at least in part through modification of storage system software, such as SFSS, that utilizes one or more CDCs of the type described elsewhere herein for discovery of NVMe/TCP endpoints. SFSS in some embodiments provides an end-to-end automated and integrated NVMe implementation over Ethernet fabric connecting NVMe hosts and targets using NVMe/TCP. Various functions of SFSS are at least in part policy-driven to help automate NVMe-OF storage service discovery, end-point registration, connectivity and zoning services.

For example, SFSS enables hosts/clients to automatically discover storage endpoints and connect to those endpoints. Zones are created in SFSS software or inherit configuration from a storage subsystem.

Some embodiments disclosed herein establish minimum and maximum numbers of possible endpoints for each host. The minimum is illustratively a default specifying a minimum number of endpoints that a host can establish connections with at any point in time. The difference between the minimum and the maximum numbers of endpoints serves as buffer to accommodate unexpected application bandwidth demands and/or to address SAN fabric issues that may have adversely impacted current connections.

The CDC illustratively maintains a Discovery Log Page that is returned in response to a Get Log Page command. The Discovery Log Page illustratively contains a list of subsystem endpoints to which a host can connect.

AENs are used by the CDC to notify hosts and subsystems of any changes in the SAN fabric. The CDC can also receive AERs, for example, when a host or a subsystem changes its configuration.

The CDC also illustratively maintains a zoning database that stores configured zone sets and active zone sets. A given zone set may have both a set of active endpoints and a set of configured endpoints associated therewith.

An illustrative embodiment that may be implemented in the above-described system 300 or another system disclosed herein includes an algorithm with the following steps, although additional or alternative steps can be used in other embodiments, and the ordering of the steps can be varied. For example, although shown in serial order, at least some of the steps can be performed at least in part in parallel with other ones of the steps.

1. A zone service implemented in SFSS or other storage software is configured to initially activate only the minimum number of subsystem endpoints to which a host should connect. These endpoints are part of the corresponding active zone set. Additional subsystem endpoints to which the host could possibly connect to when desired and/or requested are part of the corresponding configured zone set. These additional subsystem endpoints are therefore part of the configured zone set but are not yet activated and are therefore not yet part of the active zone set. A given "zone set" as that term is broadly used herein can in some embodiments include at least one of an active zone set and a configured zone set.

2. Host multipathing software such as one or more MPIO drivers is configured, for example, to detect loss of connections, to monitor changes in application workload, and/or to detect SAN issues through FPINs. Other types of conditions indicative of performance issues can additionally or alternatively be detected.

3. Detection of one or more such conditions above corresponding thresholds triggers the host multipathing software and/or other host software to automatically request a dynamic adjustment in one or more zone sets. The request can include a request to add, replace and/or reduce subsystem endpoints in the zone set. Such a request is illustratively sent from the host to the CDC, possibly using a VU command.

4. Additionally or alternatively, the dynamic adjustment can be triggered responsive to the CDC receiving an AEN from an NVM subsystem indicating a loss or other change in one or more endpoints that will adversely impact the current host connections. The host will then receive an AEN from the CDC that causes the host to send a Get Log Page command to determine the new endpoints to which it should connect to alleviate the detected condition or conditions.

Again, the above algorithm is an illustrative example only, and can be varied in other embodiments.

The above-described illustrative embodiments can provide significant advantages over conventional approaches.

For example, these embodiments provide efficient techniques for implementing dynamically zoned endpoints through dynamic activation or other dynamic adjustment of zone sets.

Such embodiments allow applications and/or other host software to readily scale bandwidth requirements without the need for an administrator to watch for SAN bandwidth deficiencies or to manually rezone additional resources.

With the disclosed arrangements, IO processing performance is significantly improved, and the system can more easily meet performance goals.

Illustrative embodiments disclosed herein provide techniques for dynamic adjustment of zone sets that facilitate the usage of advanced storage access protocols such as NVMe-oF or NVMe/TCP while avoiding drawbacks of conventional practice. For example, some embodiments can substantially eliminate or otherwise alleviate the need for manual intervention by storage administrators or other users, thereby providing significantly more flexible zone set arrangements, resulting in improved performance.

Some embodiments leverage a centralized discovery controller to provide centralized dynamic adjustment of zone sets, illustratively by configuring the centralized discovery controller to automatically trigger or otherwise initiate an adjustment of at least one zone set responsive to indicating information sent from host multipathing software and/or from one or more storage nodes of a distributed storage system.

These and other embodiments provide significant benefits to administrators and other system users. Such benefits are provided in some embodiments through modification of existing components, such as MPIO drivers and centralized discovery controllers, in the manner disclosed herein.

Illustrative embodiments disclosed herein can operate with any storage access protocol such as those based on NVMe and/or SCSI on any host operating system and with any storage system configuration.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement hosts and distributed storage systems with functionality for dynamic adjustment of zone sets will now be described in greater detail with reference to FIGS. 4 and 5. Although described in the context of system 100, these platforms may also be used to implement at least portions of other information processing systems in other embodiments.

Figure 4:
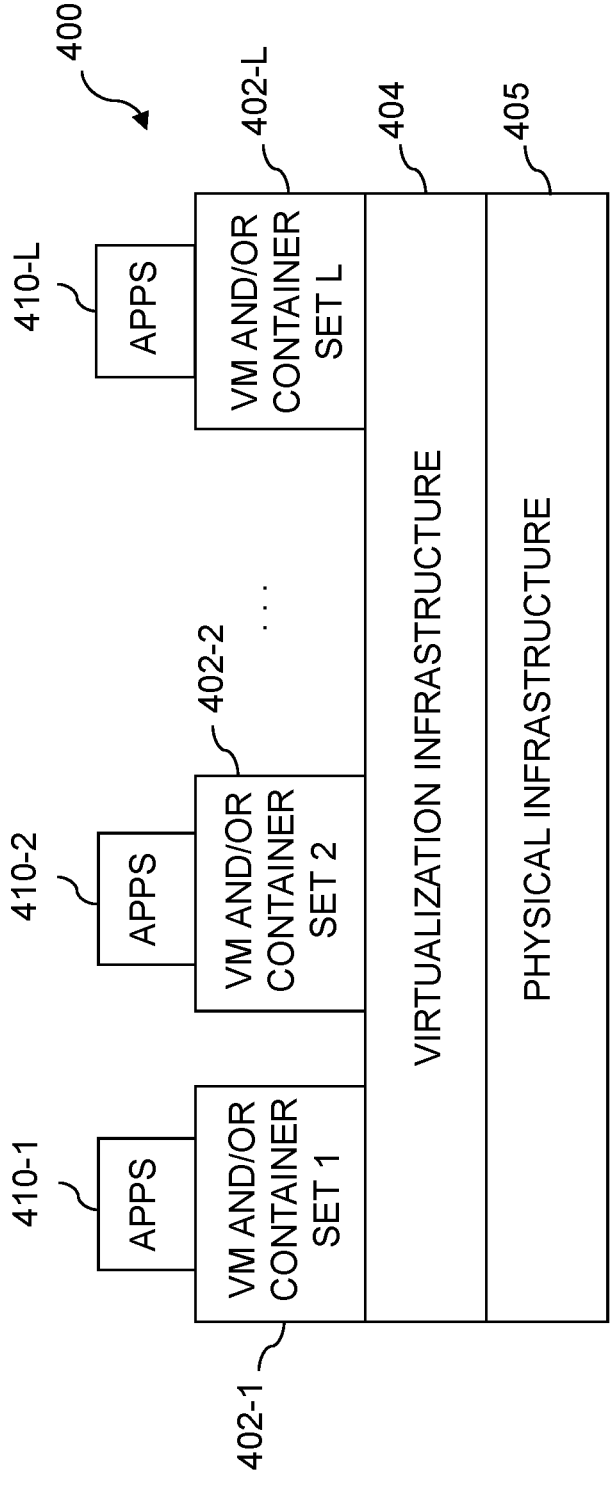
FIGS. 4 and 5 show examples of processing platforms that may be utilized to implement at least a portion of an information processing system in illustrative embodiments.
Figure 5:
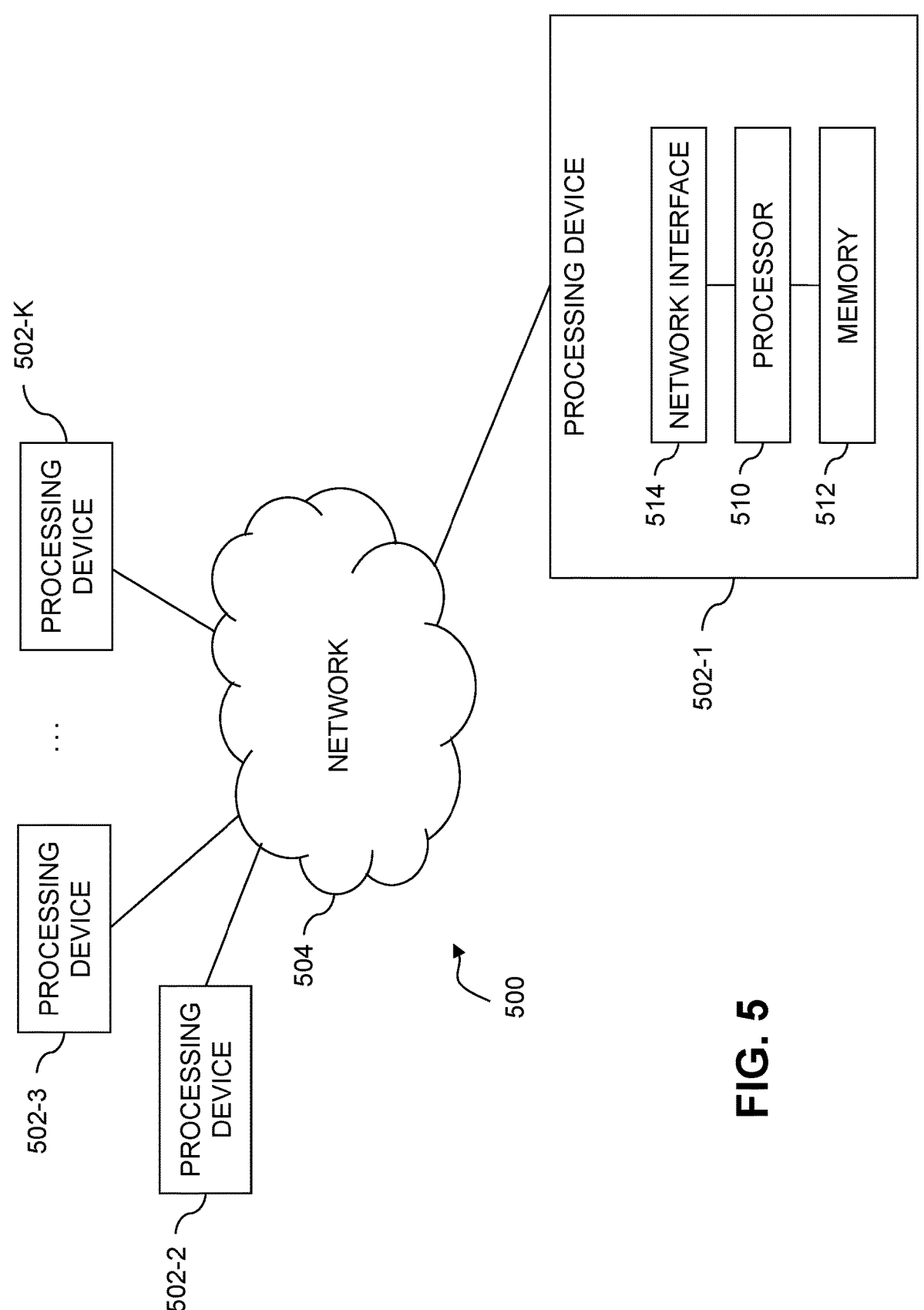

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide functionality for dynamic adjustment of zone sets in a distributed storage system of the type described above using one or more processes running on a given one of the VMs. For example, each of the VMs can implement logic instances and/or other components for implementing functionality associated with dynamic adjustment of zone sets in the system 100.

A hypervisor platform may be used to implement a hypervisor within the virtualization infrastructure 404. Such a hypervisor platform may comprise an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can also provide functionality for dynamic adjustment of zone sets in a distributed storage system of the type described above. For example, a container host supporting multiple containers of one or more container sets can implement logic instances and/or other components for implementing functionality associated with dynamic adjustment of zone sets in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for dynamic adjustment of zone sets provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hosts, storage systems, storage nodes, storage devices, storage processors, initiators, targets, MPIO drivers, multi-path layers, zone set adjustment logic, path selection logic, switch fabrics, switch infrastructure, centralized discovery controllers and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
  at least one processing device comprising a processor coupled to a memory;
  the at least one processing device being configured:
  to implement a centralized discovery controller for coupling to a host and to a storage system accessed by the host;
  wherein the centralized discovery controller is configured:
  to receive discovery requests from the host and to provide, in response to each of one or more of the discovery requests, information identifying at least one storage system endpoint to which the host is permitted to connect;
  to receive, from at least one of the host and the storage system, information indicating a need for an adjustment in at least one zone set, a given such zone set specifying a plurality of endpoints including one or more host endpoints and one or more storage system endpoints; and
  responsive to the received information, to automatically initiate the adjustment in the at least one zone set;
  wherein the information indicating a need for an adjustment in at least one zone set comprises a request from the host, generated based at least in part on a condition detected by the host, to move at least one endpoint from a configured zone set maintained for the host in the centralized discovery controller to an active zone set maintained for the host in the centralized discovery controller, the request being sent from the host to the centralized discovery controller to direct the centralized discovery controller to modify the configured zone set and the active zone set as requested by the host, the modification of the configured zone set and the active zone set being carried out in the centralized discovery controller through adjustment of the configured zone set and the active zone set in at least one zoning database maintained by the centralized discovery controller.

2. The apparatus of claim 1 wherein the at least one processing device comprises at least a portion of a switch fabric over which the host communicates with the storage system.

3. The apparatus of claim 1 wherein the host endpoints comprise respective host initiators and the storage system endpoints comprise respective storage system targets.

4. The apparatus of claim 1 wherein the centralized discovery controller is further configured to identify particular targets of the storage system that are accessible to the host.

5. The apparatus of claim 1 wherein the information indicating the need for the adjustment in the at least one zone set is received in the centralized discovery controller from a multi-path input-output driver of the host and wherein the multi-path input-output driver controls delivery of input-output operations from the host to the storage system over selected paths.

6. The apparatus of claim 5 wherein the information indicating the need for the adjustment in the at least one zone set is generated by the multi-path input-output driver based at least in part on an issue detected by the multi-path input-output driver, wherein the issue detected by the multi-path input-output driver comprises at least one of:
  a loss of at least a threshold number of connections between one or more host endpoints and one or more storage system endpoints;
  at least a threshold amount of change in a workload of at least one application executing on the host; and
  at least a threshold amount of performance degradation associated with one or more fabric performance impact notifications (FPINs) relating to a storage area network (SAN) over which the host communicates with the storage system.

7. The apparatus of claim 1 wherein the information indicating the need for the adjustment in the at least one zone set comprises a request from the host for the centralized discovery controller to initiate a particular type of adjustment in the at least one zone set.

8. The apparatus of claim 7 wherein the particular type of adjustment comprises at least one of an addition of at least one endpoint to a given zone set and a deletion of at least one endpoint from the given zone set.

9. The apparatus of claim 7 wherein the request for the centralized discovery controller to initiate a particular type of adjustment in the at least one zone set comprises at least one command sent from a multi-path input-output driver of the host utilizing a particular storage access protocol.

10. The apparatus of claim 7 wherein the request for the centralized discovery controller to initiate a particular type of adjustment in the at least one zone set comprises a request to modify a status of at least one endpoint from a configured status to an active status for the at least one zone set.

11. The apparatus of claim 1 wherein the information indicating the need for the adjustment in the at least one zone set comprises a request from the storage system for the centralized discovery controller to initiate a particular type of adjustment in the at least one zone set.

12. The apparatus of claim 1 wherein the information indicating the need for the adjustment in the at least one zone set comprises at least one Asynchronous Event Notification (AEN) sent from one of the host and the storage system and associated with at least one corresponding Asynchronous Event Request (AER) previously sent by the centralized discovery controller to one of the host and the storage system.

13. The apparatus of claim 12 wherein the AEN is sent from the storage system to the centralized discovery controller and indicates a detected condition relating to one or more storage system endpoints that will adversely impact one or more connections between the host and the storage system.

14. The apparatus of claim 13 wherein responsive to receipt of the AEN from the storage system, the centralized discovery controller automatically initiates the adjustment in the at least one zone set at least in part by sending an AEN to the host, wherein the host, responsive to receipt of the AEN from the centralized discovery controller, sends a log page command to the centralized discovery controller to determine one or more new endpoints to which it should connect to alleviate the detected condition.

15. A computer program product comprising a non-transitory processor-readable storage medium having stored therein program code of one or more software programs, wherein the program code when executed by at least one processing device comprising a processor coupled to a memory, causes the at least one processing device:

to implement a centralized discovery controller for coupling to a host and to a storage system accessed by the host;

wherein the centralized discovery controller is configured:

to receive discovery requests from the host and to provide, in response to each of one or more of the discovery requests, information identifying at least one storage system endpoint to which the host is permitted to connect;

to receive, from at least one of the host and the storage system, information indicating a need for an adjustment in at least one zone set, a given such zone set specifying a plurality of endpoints including one or more host endpoints and one or more storage system endpoints; and responsive to the received information, to automatically initiate the adjustment in the at least one zone set;

wherein the information indicating a need for an adjustment in at least one zone set comprises a request from the host, generated based at least in part on a condition detected by the host, to move at least one endpoint from a configured zone set maintained for the host in the centralized discovery controller to an active zone set maintained for the host in the centralized discovery controller, the request being sent from the host to the centralized discovery controller to direct the centralized discovery controller to modify the configured zone set and the active zone set as requested by the host, the modification of the configured zone set and the active zone set being carried out in the centralized discovery controller through adjustment of the configured zone set and the active zone set in at least one zoning database maintained by the centralized discovery controller.

16. The computer program product of claim 15 wherein the information indicating the need for the adjustment in the at least one zone set comprises a request from one of the host and the storage system for the centralized discovery controller to initiate a particular type of adjustment in the at least one zone set.

17. The computer program product of claim 15 wherein the information indicating the need for the adjustment in the at least one zone set comprises at least one Asynchronous Event Notification (AEN) sent from one of the host and the storage system and associated with at least one corresponding Asynchronous Event Request (AER) previously sent by the centralized discovery controller to one of the host and the storage system.

18. A method comprising:

implementing a centralized discovery controller for coupling to a host and to a storage system accessed by the host, the centralized discovery controller being configured to receive discovery requests from the host and to provide, in response to each of one or more of the discovery requests, information identifying at least one storage system endpoint to which the host is permitted to connect;

receiving, in the centralized discovery controller from at least one of the host and the storage system, information indicating a need for an adjustment in at least one zone set, a given such zone set specifying a plurality of endpoints including one or more host endpoints and one or more storage system endpoints; and responsive to the received information, automatically initiating in the centralized discovery controller the adjustment in the at least one zone set;

wherein the information indicating a need for an adjustment in at least one zone set comprises a request from the host, generated based at least in part on a condition detected by the host, to move at least one endpoint from a configured zone set maintained for the host in the centralized discovery controller to an active zone set maintained for the host in the centralized discovery controller, the request being sent from the host to the centralized discovery controller to direct the centralized discovery controller to modify the configured zone set and the active zone set as requested by the host, the modification of the configured zone set and the active zone set being carried out in the centralized discovery controller through adjustment of the configured zone set and the active zone set in at least one zoning database maintained by the centralized discovery controller; and wherein the method is performed by at least one processing device comprising a processor coupled to a memory.

19. The method of claim 18 wherein the information indicating the need for the adjustment in the at least one zone set comprises a request from one of the host and the storage system for the centralized discovery controller to initiate a particular type of adjustment in the at least one zone set.

20. The method of claim 18 wherein the information indicating the need for the adjustment in the at least one zone set comprises at least one Asynchronous Event Notification (AEN) sent from one of the host and the storage system and associated with at least one corresponding Asynchronous Event Request (AER) previously sent by the centralized discovery controller to one of the host and the storage system.

* * * * *